US009401948B2

(12) United States Patent
Mountain et al.

(10) Patent No.: US 9,401,948 B2
(45) Date of Patent: Jul. 26, 2016

(54) SYSTEM AND METHOD FOR ENHANCING MULTI-MODULE EXPERIENCE

(71) Applicant: Yahoo! Inc., Sunnyvale, CA (US)

(72) Inventors: Jane Mountain, Los Angeles, CA (US); Guy Schackman, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 282 days.

(21) Appl. No.: 14/027,140

(22) Filed: Sep. 13, 2013

(65) Prior Publication Data
US 2015/0081765 A1    Mar. 19, 2015

(51) Int. Cl.
| G06F 15/16 | (2006.01) |
| H04L 29/08 | (2006.01) |
| H04L 29/06 | (2006.01) |
| H04W 4/18 | (2009.01) |
| G06F 17/30 | (2006.01) |

(52) U.S. Cl.
CPC ............... *H04L 67/02* (2013.01); *H04L 65/60* (2013.01); *H04L 67/10* (2013.01); *H04W 4/18* (2013.01); *G06F 17/30893* (2013.01)

(58) Field of Classification Search
None
See application file for complete search history.

(56) References Cited

U.S. PATENT DOCUMENTS

| 2009/0113317 | A1* | 4/2009 | Summers et al. | 715/760 |
| 2010/0146110 | A1* | 6/2010 | Christensen et al. | 709/224 |
| 2010/0251143 | A1* | 9/2010 | Thomas et al. | 715/760 |
| 2011/0125739 | A1* | 5/2011 | Wexler et al. | 707/734 |
| 2013/0117657 | A1* | 5/2013 | Verlaan et al. | 715/234 |
| 2013/0219263 | A1* | 8/2013 | Abrahami | 715/234 |
| 2013/0227078 | A1* | 8/2013 | Wei et al. | 709/219 |
| 2013/0288212 | A1* | 10/2013 | Bist | 434/236 |
| 2014/0244784 | A1* | 8/2014 | Jaskiewicz et al. | 709/217 |
| 2014/0304682 | A1* | 10/2014 | Taylor et al. | 717/113 |
| 2015/0058358 | A1* | 2/2015 | Xu | 707/748 |

* cited by examiner

Primary Examiner — Viet Vu
Assistant Examiner — James Edwards
(74) Attorney, Agent, or Firm — Martine Penilla Group, LLP

(57) ABSTRACT

Methods and systems for processing content from multiple content sources includes identifying a plurality of content sources for rendering content on a website. A plurality of content modules associated with the website, are identified. Each content module is configured to render content from each of the plurality of content sources. A rendering size of each of the content modules selected for rendering on the website, is identified. The content format for each of the plurality of content module is defined for the identified rendering size of each of the content modules. A selection of one of the plurality of content modules is received. The selection causes a reconfiguration of the rendering sizes of one or more of the plurality of content modules. The content format of the one or more of the plurality of content modules is adjusted based on the rendering sizes after the reconfiguration.

20 Claims, 11 Drawing Sheets

| COUNTDOWN | | 210 |
|---|---|---|
| NT1 | | 220 |
| Module 3<br>Map<br>250 | Mod. 1<br>230 | Mod. 4<br>260 |
| | Mod. 2<br>240 | Mod. 5<br>270 |
| | LREC<br>280 | |

Figure 2C

| COUNTDOWN | | 210 |
|---|---|---|
| NT1 | | 220 |
| Module 2<br>The Signal<br>240 | Mod. 1<br>230 | Mod. 4<br>260 |
| | Mod. 3<br>250 | Mod. 5<br>270 |
| | LREC<br>280 | |

Figure 2D

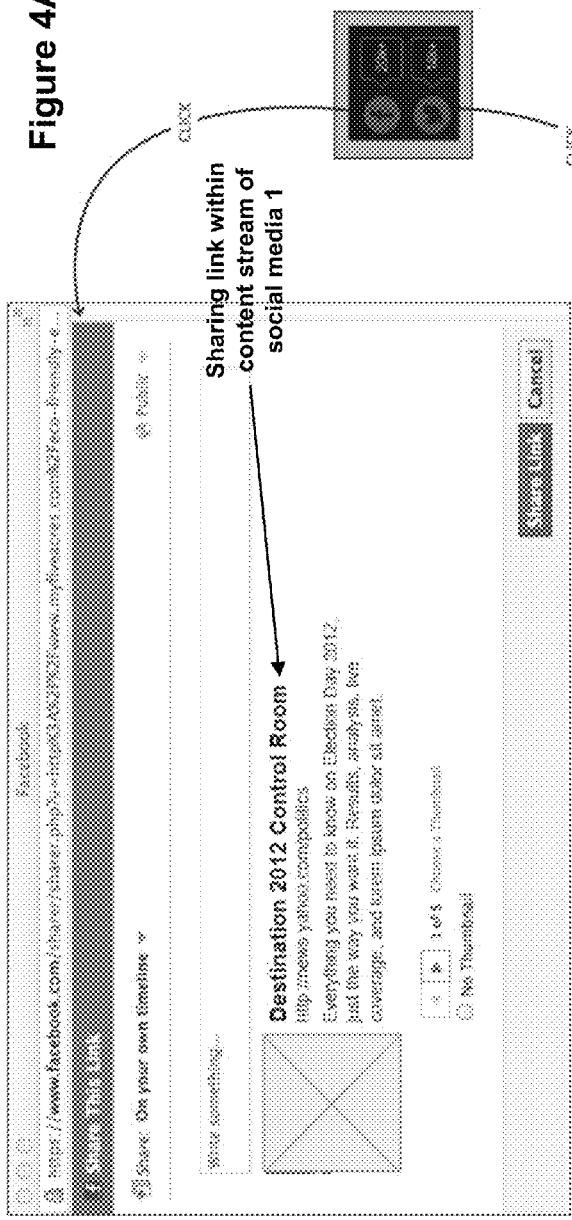
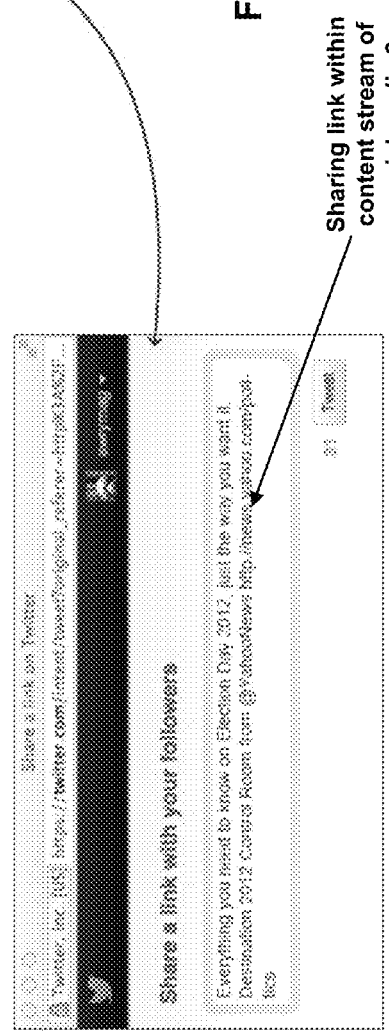
Figure 4A
Figure 4B

SYSTEM AND METHOD FOR ENHANCING MULTI-MODULE EXPERIENCE

BACKGROUND

1. Field of the Invention

The invention relates generally to providing online media content and, more particularly, to providing online media content for a multi-faceted event.

2. Description of the Related Art

Online media content has grown tremendously over the years in quantity and quality. Content providers are trying to find effective ways to present information to the users in order to attract and retain users on their website/webpage. When a multi-faceted event occurs, dozens to hundreds of pages of content are generated by multiple content providers providing different perspective of the event. These pages allow the user to get various different perspectives of the event. The users access multiple pages of content provided by different content providers by opening these pages in multiple windows or tabs and hop back and forth between the different windows and/or tabs. With a highly socially interactive society, users wishing to share the stories with other users have to access each of the content sites and select to share the content.

It would be advantageous if the event related information is presented in a simple and meaningful way to allow the users to experience and share a rich event-related experience.

It is in this context that the embodiments of the invention arise.

SUMMARY

Embodiments of the disclosure provide methods and system for processing content from multiple content sources. A webpage having a plurality of content modules is rendered on a website. The content for the content modules are obtained from a plurality of content sources. The content modules are rendered on the webpage such that the content format conforms to a rendering size associated with the content modules. When a user selects a content module on the webpage, one or more of the content modules rendered on the webpage are reconfigured. The reconfiguration causes adjusting the content rendered in the content module so as to provide a user with full perspective of the multi-faceted event.

The various embodiments, as will be described below, define ways to package a dense amount of information in a simple, user-friendly manner so as to allow the users to access multiple channels of information from multiple sources from within the confines of a webpage. The users are provided with options to focus on all the content types or on any one content type while still having access to all the other content. The content presented in each of the modules is updated dynamically so that users are provided with current content from various content sources. The content modules are presented in a "Control Room" design format allowing the users to select to access more content from any one of the content modules. When the user selects a content module, the selected content module fluidly expands in size to render additional content while the remaining content modules seamlessly shrink in size minimizing the content within each to make them usable at the smaller size. Additionally, the remaining content modules move out of the way to enable the user to view the content of not only the selected content module but also the other modules. The dynamic nature of the control room design gives the user constant access to multiple streams of the story from within the single webpage. It should be appreciated that the present embodiments can be implemented in numerous ways, such as a process, an apparatus, a system, a device, or a method on a computer readable medium. Several embodiments are described below.

In one embodiment, the present invention provides a method for processing content from multiple content sources. The method includes identifying a plurality of content sources for rendering content on a website. A plurality of content modules that are associated with the website are identified. Each content module is configured to render content from each of the plurality of content sources. A rendering size for rendering each of the content modules on the website, is identified. A content format for rendering content at each of the plurality of content modules is defined for the identified rendering size of each of the content modules. A selection of one of the plurality of content modules is received. The selection causes reconfiguration of the rendering sizes of one or more of the content modules. The content format of one or more of the plurality of content modules is adjusted based on the rendering sizes after the reconfiguration.

In another embodiment, a method for processing content from multiple content sources is disclosed. The method includes providing a webpage with a plurality of modules, on a website. Each of the plurality of modules is configured to render content obtained from a content source. Each of the plurality of modules is associated with a rendition state and the content from the content source is selected in accordance to the rendition state of the respective content modules. A selection of a module is received at the webpage. The selection causes reconfiguration of one or more of the plurality of modules on the webpage. The reconfiguration results in adjusting the rendition state of one or more of the plurality of modules. Content from content source is returned for rendering in each of the plurality of modules based on the adjusted rendition state. The content format for rendering the content at the one or more of the plurality of modules is adjusted in accordance to adjusted rendition state of the one or more of the plurality of modules.

In yet another embodiment, a non-transitory computer-readable medium with program instructions for processing content from multiple content sources, is disclosed. The computer-readable medium includes program instructions for identifying a plurality of content sources for rendering content on a website; program instructions for identifying a plurality of content modules associated with the website, wherein each content module is configured to render content from each of the plurality of content sources; program instructions for identifying a rendering size for each of the content modules on the website, wherein a content format for each of the plurality of content modules is defined for the identified rendering size of each of the content modules; program instructions for receiving a selection of one of the plurality of content modules, the selection causes a reconfiguration of the rendering sizes of each of the content modules; and program instructions for adjusting the content format of one or more of the plurality of content modules based on the rendering sizes after the reconfiguration.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIGS. 2A, 2A-1, 2B, 2B-1, and 2C-2E illustrate simple block diagram of exemplary layouts of the content modules during rendering and selection of content modules, in accordance with various embodiments of the invention.

FIGS. 4A-4B illustrate exemplary screen renditions identifying options available for sharing a webpage on a website or for sharing one or more of the content modules available on a webpage, in accordance with embodiments of the present invention.

DETAILED DESCRIPTION

Figure 1:
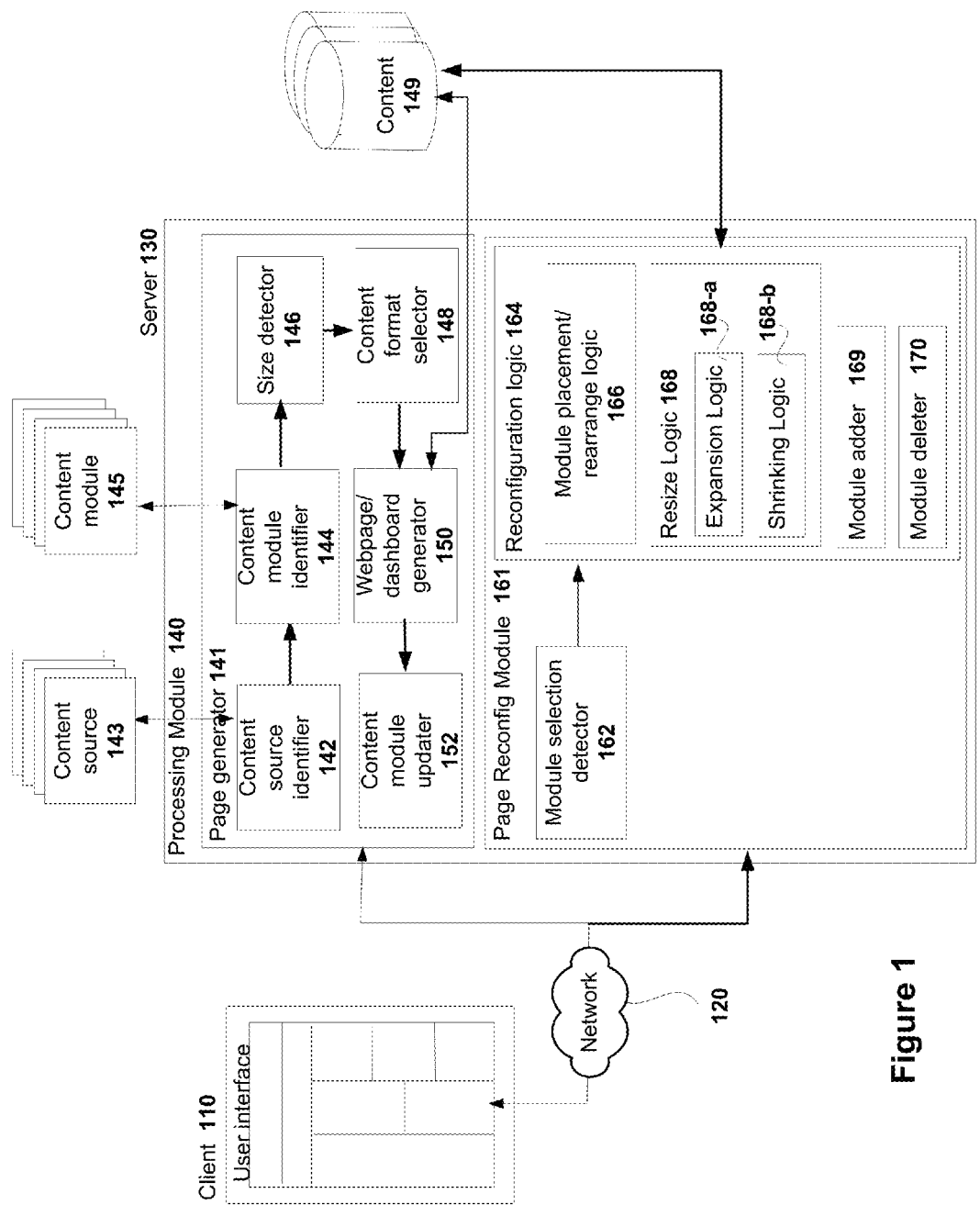
FIG. 1 illustrates a simple block diagram of various modules within a processing module for processing content from multiple content sources, in accordance with an embodiment of the present invention.

Embodiments of the present invention provide system, computer readable media having program instructions, and methods for processing content from multiple content sources. More particularly, according to various embodiments of present invention, a modularization technique is used to generate a dynamic 'dashboard' of content from a plurality of content sources and presented to a user in a simple and concise manner. The dashboard resembles a "Control Room" with content presented in a modular design that allows users access to multiple channels of information provided by one or more content sources within a single, small space. The dashboard packages and presents dense amount of information in a user-friendly manner and allows the user to interact with each of the content modules to obtain additional content. The interactive option gives the user an opportunity to focus on one content type while still providing access to all the other content modules within the dashboard. User selection at a content module within the dashboard causes the selected content module to expand, giving access to more content in the expanded version. During the selection of a content module, the non-selected content modules shrink, resizing and minimizing the content presented within each of the non-selected content modules to make the content usable at the smaller size. The expanded version of the selected content module may be presented in a prominent location in the dashboard reflecting the user's focus at any given time and the non-selected content modules move to a side. One or more of the content modules also provide interaction capability allowing the user to comment, participate in polls, view, chat, share, select and perform other types of interaction with the various content modules. The modular design of the dashboard and the fluid and dynamic nature of the content modules resizing and relocating within the dashboard gives the user constant access to multiple streams of the story from different content sources within a single space of the dashboard allowing the user to experience the multi-faceted event as the event unfolds. The dashboard, in some embodiments, may be presented in the form of a webpage on a website.

The user is able to share one or more of the content modules or the dashboard with other users inviting the other users to participate in discussions, comment on content, chat with the user, participate in polls, etc. To enable the user to interact with and share the content with other users, one or more sharing/interaction options are provided in the dashboard and in each of the content modules.

Conventional applications provided content on a webpage for an unfolding event by generating multiple pages of textual or multimedia content and the users accessed the content by hopping from one webpage to another to get a full perspective of the unfolding event. Such applications provided the perspective of a single content provider at a time. The current embodiments, on the other hand, provide a more robust interactive experience of a "Control Room" wherein content from a plurality of content sources are presented in a dashboard format. The content is being constantly updated to provide current status of the event and the dashboard gives the user constant access to streaming multiple streams of the story related to the event.

FIG. 1 illustrates an exemplary system that is used for processing content from multiple content sources, in one embodiment. The system includes a server device 130 in which a processing module 140 with programming logic for processing content from multiple content sources executes. The server device may be part of a host system accessed through a website. The host system is hosted by a content provider, a content generator or a content accumulator/aggregator. The server device 130 interacts with a client device 110 over a network 120, such as the Internet. The client device 110 includes a display device with a user interface that is configured to enable a user to access a webpage generated by the processing module 140 and to interact with the one or more content modules on the webpage to obtain additional information.

The processing module 140 includes a plurality of modules that are configured to obtain content from a plurality of content sources for an event, generate a dashboard of content modules for presentation on a webpage of the website and transmit the webpage over a network 120, such as the Internet, to the client device 110 for rendering and user interaction, when requested. Each of the content modules presented in the dashboard is associated with a rendering size. The content for the respective content modules is selected and presented in the content module based on a content format identified for the rendering size. The rendering size of each content module may be same or different. User interaction, in the form of selection of a content module from the plurality of content modules, is used to reconfigure the rendering sizes of one or more of the content modules and to adjust content format of one or more of the plurality of content modules presented in the webpage based on the adjusted rendering size.

In one embodiment, the processing module 140 includes a page generator module 141 and a page reconfig module 161. The page generator module 141, in turn, may include additional modules, such as a content source identifier 142, a content module identifier 144, a size detector 146, a content format selector 148, webpage or dashboard generator 150, and a content module updater 152. The page reconfig module 161 includes a module selection detector 162 and a reconfiguration logic 164. The reconfiguration logic 164 may further include one or more modules, such as module placement/rearrange logic 166, resize logic 168, a module adder 169 and a module deleter 170. The various functions of each of the modules will now be described in detail.

The content source identifier module 142 is configured to identify one or more content sources 143 for providing content for an event. The content source may be identified based on type of content that is desired to be included for the event in a webpage for the website. In some embodiments, a website designer or the hosting site will determine the type of content that is to be included in the webpage, for the event. For example, for an election event, the type of content may include video content, latest news content, map content, a poll content, a signal content, to name a few. For a major sports event, such as a Super Bowl or a Wimbledon Tennis or US Open Golf Tournament, the type of content may include video content, audio content, latest news content, player stats content, people's pulse/polling content, etc. As mentioned earlier, the content source may be a content provider, a content aggregator, a content generator, any other source that is capable of providing relevant content for the event, or any combinations thereof. In some embodiments, the content source may be the host that is hosting the website. The content sources are identified in response to an event unfolding/occurring or scheduled to occur in real life. A single content source/provider may provide more than one type of content. For example, a single content provider/source may provide video content, an audio content, a graphic content, etc.

The content module identifier 144 is configured to identify a plurality of content modules 145 to be used for rendering content for the website. The content module identifier 144 may interact with the content source identifier 142 to determine the type of content that is to be included on a webpage for the website and identify the content modules accordingly. The content modules act as containers or display areas on the webpage for presenting the content.

The size detector module 146 interacts with the content module identifier 144 to obtain information related to the identified content modules and is configured to determine rendering size of each of the identified content modules. The rendering size of the content module identifies one or more of shape, display area, placement on the webpage for the website, state etc., as specified by the webpage/website designer. The above list for the rendering size is exemplary and should not be considered exhaustive. In one embodiment, each content module may have three presentation states—small, medium, and large. In another embodiment, each content module may have two presentation states—small and large. The number of states related to the content modules is not restricted to two or three presentation states but may include additional presentation states. The rendering size drives the content format for rendering content at each of the respective content modules.

The content format selector module 148 is configured to interact with the size detector module 146 to receive the rendering size of each of the content modules included on the webpage for the website and identify content formats for presenting the content at the respective modules. The content format may be specific to content type of content to be presented in the content module. For example, the content format selected may be specific to streaming content, image content, drawing content, static content, dynamically changing content, feed content, social content, news outlet content, video content, ad content, interactive content, chat content or any combinations thereof. When a single content provider provides two or more content, each of the content may be rendered using a different content format. This may be due to the fact that the content may be of different content type or may be presented in a different way. In one embodiment, the content format is selected from plurality of content formats 149 based on the presentation state defined by the rendering size of each content module. The selected content format optimizes the content for the rendering size of each of the content modules. The content format is used to determine content for presenting, bandwidth to be used for receiving content, etc. Based on the content format selected for each of the content modules, appropriate content is selected for the content modules. For example, when a map module is included as part of the website for an event, such as an election event, the rendering size of the map module is first identified. A content format is selected for presenting map-related content in the map module, based on the rendering size, to enable a user to easily decipher the content rendered within the map content module of the webpage. In the above example, instead of rendering the full map with the states being provided as dense set of dots (due to the rendering size), the content format may select to render the state name and the status of the candidates in that state. When the rendering size of the map module is enlarged or when the rendering size of the map module is big, the content format may allow rendering of a full version of the U.S. map with state by state results.

The information from the content source identifier 142, content module identifier 144, size detector 146 and content format selector 148 are provided to the webpage/dashboard generator 150. The webpage generator uses the information obtained by these modules and generates the webpage for the website. The webpage generator interacts with the plurality of content providers/sources to obtain content for the respective content modules based on the content format, packages the content for presentation in dashboard format on the website. A user interested in getting the multi-faceted perspective of the event accesses the website and is presented with multiple channels of information. Depending on the type of event, the website may be accessed after user authentication. User interaction at the content modules are used to provide additional content.

The content module updater 152 is configured to determine the type of content presented in each content module and provide periodic or continuous updates at the website. For content modules that include streaming content, the content module updater 152 requests and receives the streaming content from the respective one or more content sources and updates the corresponding content modules in substantial real time so as to present the most current content to the users. When the user accesses the website, the user is presented with the current status of content in each of the content modules. In one embodiment, the content modules initially presented in the website are presented using a default setting. In this embodiment, the rendering size of each of the content modules is defined at the host site.

Each user may focus on different content based on their interest. Some users may be more number-oriented and may focus on statistic based content, others may be interested in knowing the latest status and may focus on the latest stories, yet others may be interested in watching the event and may focus on the video content. The website allows each user to focus on the content of their interest while providing multiple channels of content of different types to get a bigger picture of the event. In one embodiment, each of the content modules on the website and the webpage include interaction options to allow user interaction. In some embodiments, the interaction options enable the user to select a content module to view more content, select a content module or the website for sharing with other users, provide comments, rate the content, initiate and/or participate in chats, participate in polls, etc.

When a user selects a content to request additional content, the selection is detected by a module selection detector 162 within the page reconfig module 161. In one embodiment, the selection of a content module at a client device triggers a signal to the server device to use the reconfiguration logic to process the selection request and present content based on the processing. The module selection detector 162 receives the signal and identifies the selected content module, the type of content that is being rendered in the selected content module, the rendering size of the selected content module and content format used for rendering the content. In one embodiment, the rendering size of the selected content module is the default rendering size as defined by the host that is providing the website. The information from the module selection detector is provided to the reconfiguration logic 164 to process the selection request. The reconfiguration logic 164 analyzes the information provided by the module selection detector and employs the resize logic 168 to determine if an expansion logic 168-a or a shrinking logic 168-b has to be triggered. In one embodiment, the expansion logic 168-a may be triggered when the presentation state, defined by the rendering size for the selected content, is small. Similarly, shrinking logic 168-b may be triggered if the presentation state of the selected content module is large. In some embodiments, the various content modules presented on the website that are associated with an event are presented, by default, at a medium presentation state. In this embodiment, the selection of a content module may trigger the expansion logic 168-a.

When the expansion logic 168-a is triggered, the expansion logic is configured to adjust the rendering size of the selected content module in the website to a rendering size that is larger than the rendering size of the non-selected content modules. During the adjustment of the rendering size, the expansion logic interactively enhances the content format of the selected content module so that additional content can be presented. In one embodiment, the expansion logic also increases the bandwidth for receiving content optimizing for the adjusted size thereby improving performance during additional content rendering.

In addition to the execution of the expansion logic, the resize logic will also trigger the shrinking logic 168-b to shrink the rendering size of one or more of the non-selected plurality of content modules presented on the website in order to accommodate the enhanced rendering size of the selected content module. The shrinking logic is configured to adjust the rendering size of one or more of the non-selected content modules in the website to a rendering size that is smaller than the rendering size that was used to originally render the non-selected content modules on the website. During the adjustment phase, the shrinking logic interactively reduces the content format of the selected content module so that minimal amount of content related to the topic of the content module can be presented. In one embodiment, the shrinking logic also decreases the bandwidth for receiving content optimizing for the adjusted size thereby improving performance during minimal content rendering.

The adjustment of the different content modules may be repeated every time the user selects a content module. In essence, the adjustment results in adjusting the content format that is optimized to the rendering size by increasing quality of content for the selected content module, decreasing content quality to match the rendering size for one or more of the content modules, increasing/decreasing the bandwidth of selected/non-selected content modules, etc. In one embodiment, when more than one content module is configured to render video content, the initial default view may select one of the content modules to receive the audio output. The selection may be based on the rendering size of the content module or the recency of content being rendered, popularity of the content module with other users based on the number of users watching an enhanced version of the content module, etc. When a different video content module is selected, the adjustment would result in the direction of the audio content for the selected video content module. The adjustment of the content modules may also result in converting an image content into a video content, converting a still content to video content, video content to still content, video content to image content, or one or more combinations thereof. In some embodiments, the content module rendering video content may allow interaction so that a user can pause, fast forward, reverse, stop the play, provide comments, etc.

In response to the adjustment in the content format, a module placement/rearrange logic 166 will automatically rearrange one or more of the plurality of content modules to accommodate rendering of an enhanced version of the selected content module. The rearrangement is done in such a manner so as to ensure that all the content modules within the webpage of the website are visible and accessible at all times. In one embodiment, the rearrangement includes rearranging one or more of the plurality of content modules to one or more locations on the webpage of the website. In one embodiment, the rearrange logic rearranges the one or more of the content modules that were shrunk in size by moving them to the left/right top corner or left/right bottom corner of the webpage and the module placement logic rearranges the enhanced version of the selected content module by placing the selected content module in a prominent location indicative of the user's current focus. In one embodiment, the prominent location is the center of the display area of the webpage. In this embodiment, the remaining content modules are moved to one of the sides. In one embodiment, the prominent location for rendering the selected content module depends on which content module is selected for viewing additional content.

Figure 2A:
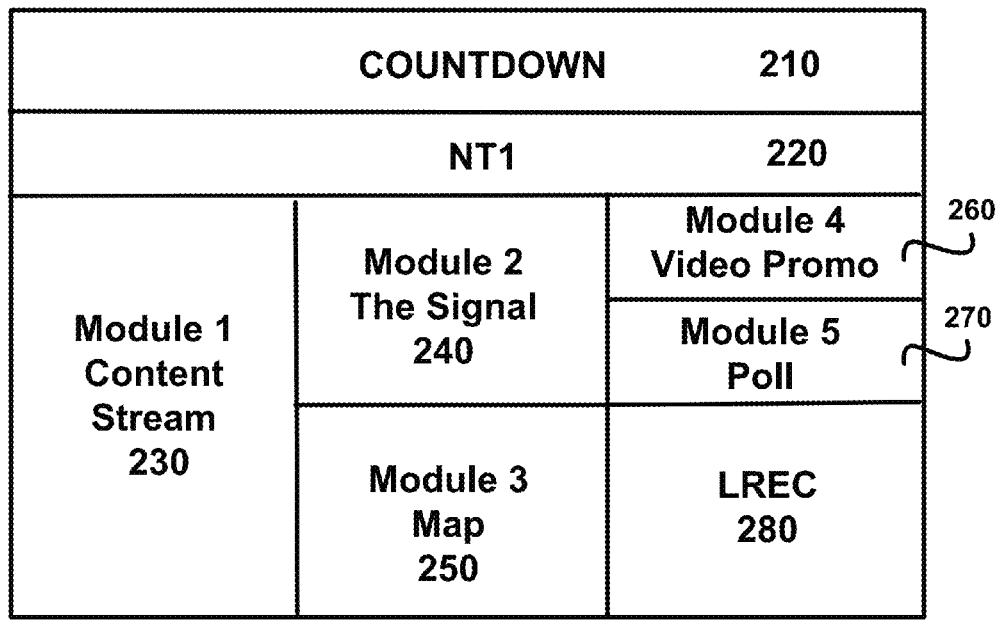

FIGS. 2A-2E illustrate exemplary module layouts when rendering the selected content module on the webpage of the website. FIG. 2A illustrates a plurality of content modules that are selected for rendering on a webpage of the website. As shown, the webpage of the website includes a countdown module 210, a promotional content module 'NT1' 220, a content stream 230 represented as 'Module 1', a signal module 240 represented as 'Module 2', a map module 250 represented as 'Module 3', a promotional video 260 represented as 'Module 4', a poll module 270 represented as 'Module 5' and a LREC module 280. Each of the content modules has a different rendering size including shape, size, location, etc. In one embodiment, the webpage illustrated in FIG. 2A is the default view of the webpage for the website. In one embodiment, each content module may include more than one type of content. In this embodiment, the different types of content may be provided by the same content provider. Alternately, different content types presented in the single content module may be provided by different content providers. FIG. 2A-1 illustrates one such example. As shown in FIG. 2A-1, module 1 230' includes both a video stream and a live blog, wherein each type of content is presented either by the same content provider or by different content providers.

Figure 2B:
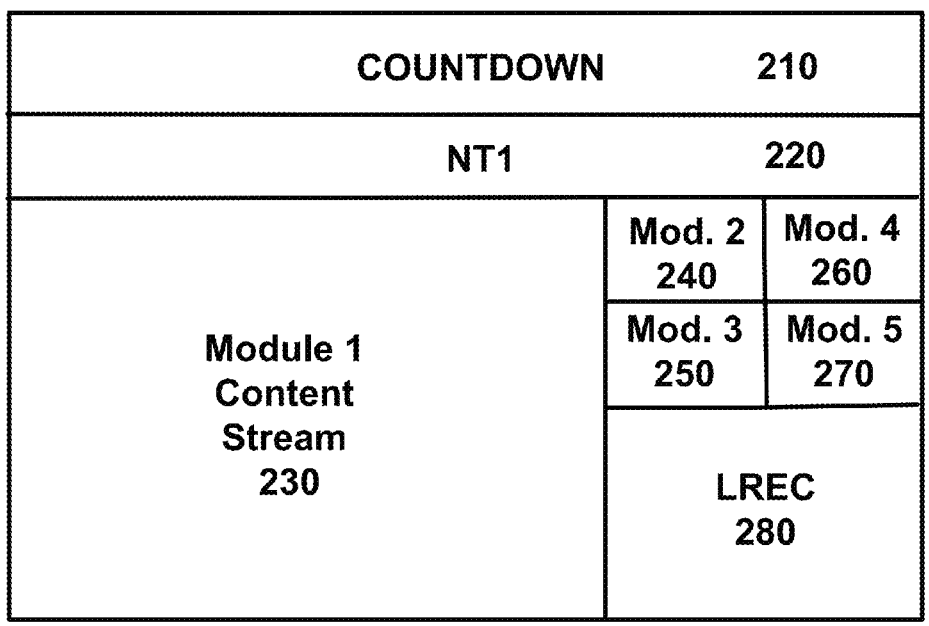

FIGS. 2B, 2B-1, 2C-2E illustrate the expanded module views of different content modules, in different embodiments. As shown in FIG. 2B, Module 1 230 was expanded in response to user selection. As a result, the rendering size of Module 1 was adjusted to increase in size, rearranged to occupy a substantial portion of the webpage from the bottom left. In this embodiment, the remaining content modules, Modules 2-5 and LREC, are rearranged to occupy the right side of a display area of the webpage. In addition to rearranging, Modules 2-5 were reduced in size. The remaining modules, Countdown 210, NT1 220 and LREC 280 continue to render at the same rendering size, including size, location, shape content. In the embodiment illustrated in FIG. 2B, Module 1 230 is associated with enhanced content format to accommodate additional content and has increased bandwidth for receiving the additional content. Meanwhile, Modules 2-5 represented by reference numerals 240-270 have reduced content format in accordance to the reduced rendering size, to accommodate minimized content and has lower bandwidth for receiving the relevant content. In an alternate embodiment illustrated in FIG. 2A-1 wherein two different types of content are presented within a single content module, the selection of the content module would result in rendering an enhanced version of the content module in the prominent position, as illustrated by module 1 in FIG. 2B-1. In this embodiment, the content format of both the video stream and the live blog are both enhanced to provide additional content.

FIG. 2C illustrates an alternate embodiment illustrated in FIG. 2B. In the embodiment illustrated in FIG. 2C, module 3 250 is selected for presenting additional content and is, therefore, associated with enhanced content format and increased bandwidth to receive and render the additional content. Meanwhile, modules 1, 2, 4 and 5 (reference numerals 230, 240, 260 and 270) are shrunk in size and moved to the side so that all the content modules are visible and accessible to the user at all times. The remaining content modules countdown 210, NT1 220 and LREC 280 continue to render at the original rendering size.

FIG. 2D illustrates an alternate embodiment illustrated in FIGS. 2B and 2C. In this embodiment, Module 2 is selected for viewing additional content. As a result, content modules 1, 3, 4, 5 and LREC (represented by reference numerals 230, 240, 250 and 270) are shrunk in size and rearranged by moving them to the right side. Meanwhile, the remaining content modules countdown 210, NT1 220 and LREC 280 continue to render at the original rendering size (shape, size, location, etc.).

Figure 2E:
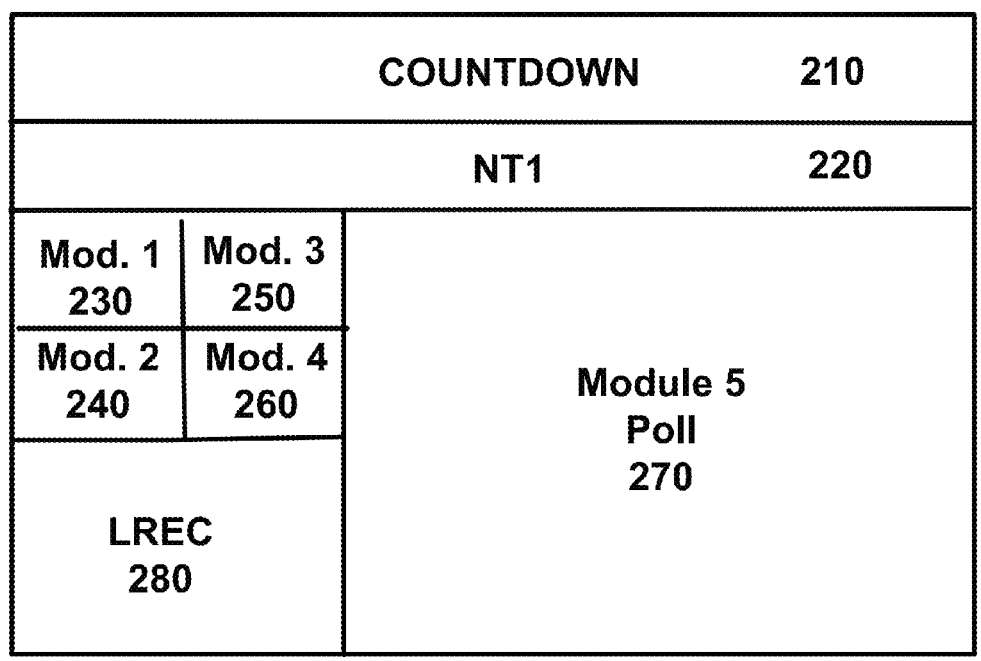
Figures 1, 2A:
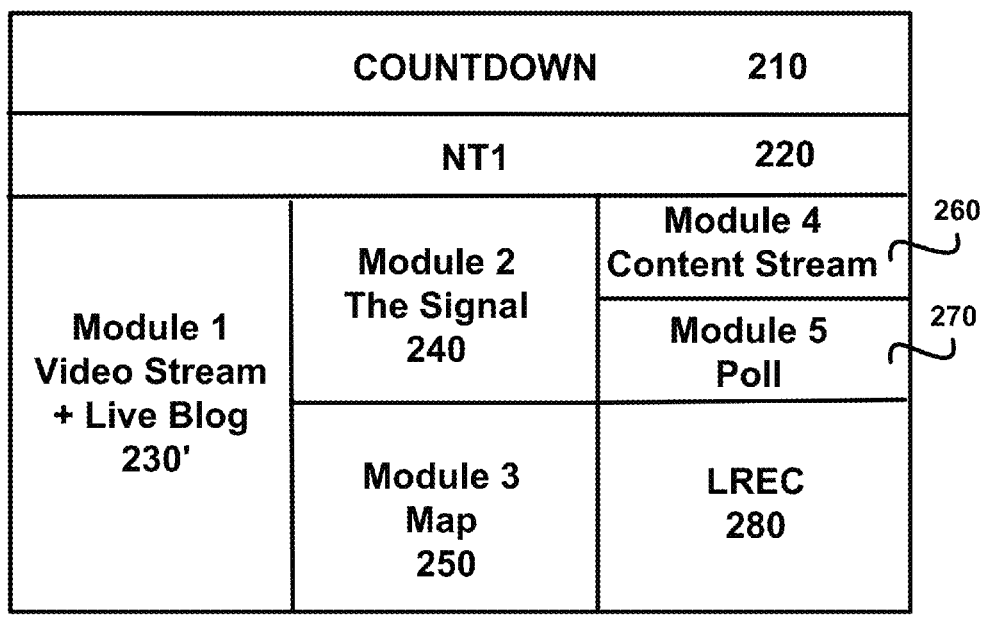
Figures 1, 2B:
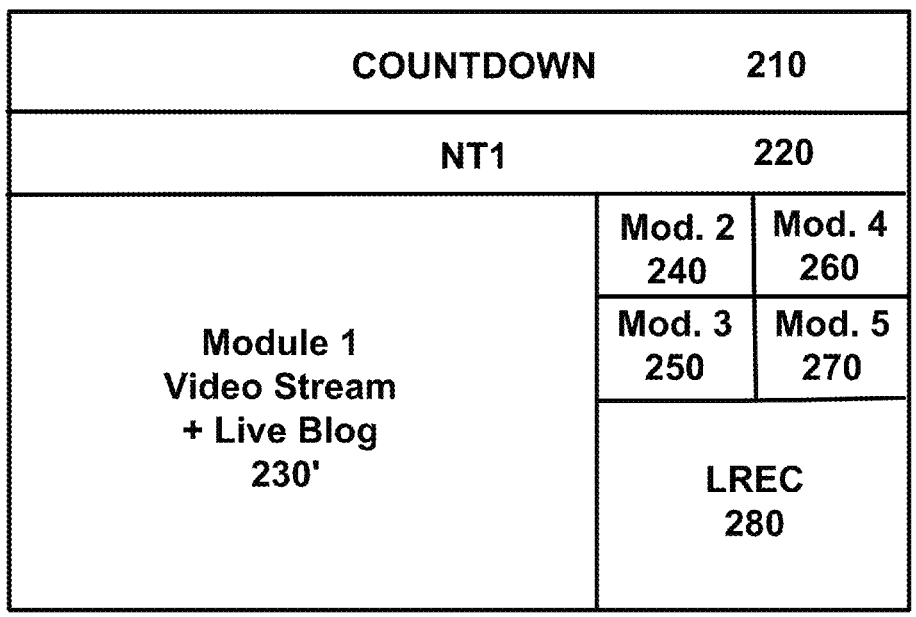

FIG. 2E illustrates yet another embodiment. In this embodiment, module 5 270 is selected for viewing additional content. As a result, some of the modules are rearranged to accommodate the enhanced content format of module 5. In this embodiment, module 5 is rendered prominently covering the lower right hand side of the display area on the webpage of the website and modules 1-4 and LREC module (represented by reference numerals 230, 240, 250, 260 and 280) are moved to the left side of the display area. As mentioned earlier, depending on the location of the selected content module, one or more of the content modules (selected and non-selected content modules) are rearranged.

In addition to the module placement/rearrange logic 166 and resize logic 168, the reconfiguration logic 164 may include a module adder 169 and a module deleter 170. In response to the selection of a content module on a webpage, the reconfiguration logic rearranges one or more of the content modules within the webpage to provide relevant content to the user. The rearrangement of content modules may include adding one or more content modules related to the event using a module adder 169 and/or deleting one or more content modules using a module deleter 170. The reconfiguration logic 164 takes into consideration the addition and/or deletion of content modules when rearranging the remaining modules including the selected content module.

The reconfiguration logic, in response to the selection, will adjust the content format of the one or more of the plurality of content modules based on the rendering sizes after the reconfiguration, identify the content appropriate for the adjusted content format, and populate the adjusted content modules with the content that is optimized for the rendering size and performance. The resulting webpage provides a multi-faceted event experience to the user.

In one embodiment, as the event progresses, one or more content modules may provide content options to view the progress of the event. FIGS. 3A-3E illustrate one such option. In this embodiment, the event is a national presidential election and the content provided is the progress of the candidates at different times. As shown, one of the content modules presented is a countdown module (210 of FIG. 2A) that includes a countdown timer. The countdown module 210 may also render an electoral vote meter that provides electoral vote count as the election results are called in from different states.

Figure 3A:
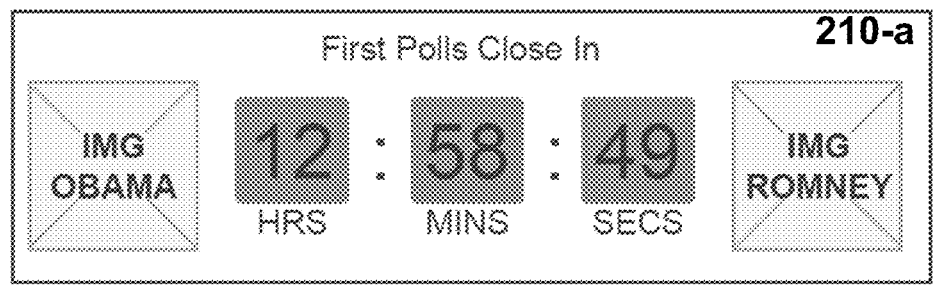
FIGS. 3A-3E illustrate simple block diagram of a content module presenting progressive content, in accordance with one embodiment of the present invention.
Figure 3B:
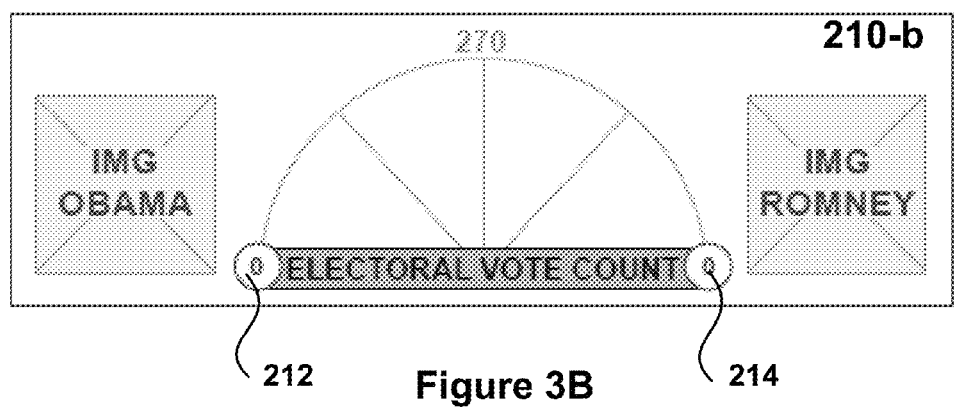

FIG. 3A illustrates the countdown module 210-*a* providing amount of time left before polls close. The countdown module 210-*a* also provides information related to the presidential contenders. As the election day progresses, the countdown timer may be replaced by an electoral vote meter. The content format, based on the rendering size of the content for the countdown module 210, may render content relevant to the countdown module. FIG. 3B illustrates an exemplary embodiment illustrating the countdown module with candidates information along with the electoral vote meter. In the embodiment shown in FIG. 3B, based on the rendering size, the electoral vote meter replaces the countdown timer. When the rendering size of the countdown module is enhanced, the countdown timer may be presented alongside the electoral vote meter. Additional content related to the countdown timer, electoral vote meter and/or the presidential candidates may also be presented in the enhanced version of the countdown timer.

Figure 3C:
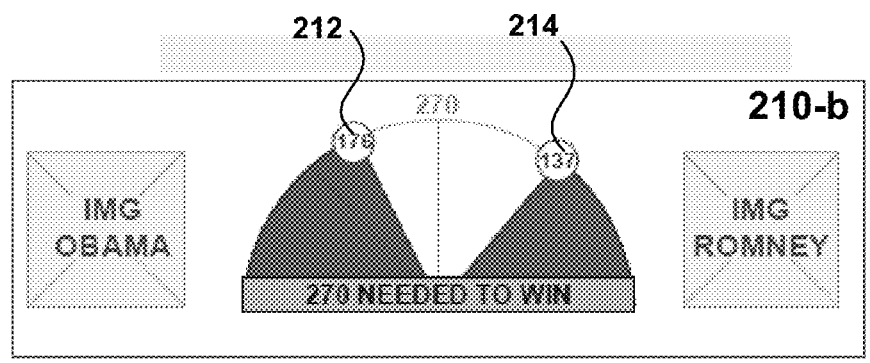

The electoral vote meter provides the electoral vote status of each candidate and the number of electoral votes needed to be declared a winner. As shown in FIG. 3B, the electoral votes of each candidate are shown in vote circles 212 and 214. Before any results are called in from different states, the electoral vote of each candidate in the vote circle is 'zero', as shown in FIG. 3B. As the evening progresses and states begin to call in their election results, the vote circles 212, 214, of the candidates begin to show the status of the candidates. Additionally each candidate's wedge grows to provide a pictorial/graphical representation of the status of the candidates, as illustrated in FIG. 3C.

Figure 3D:
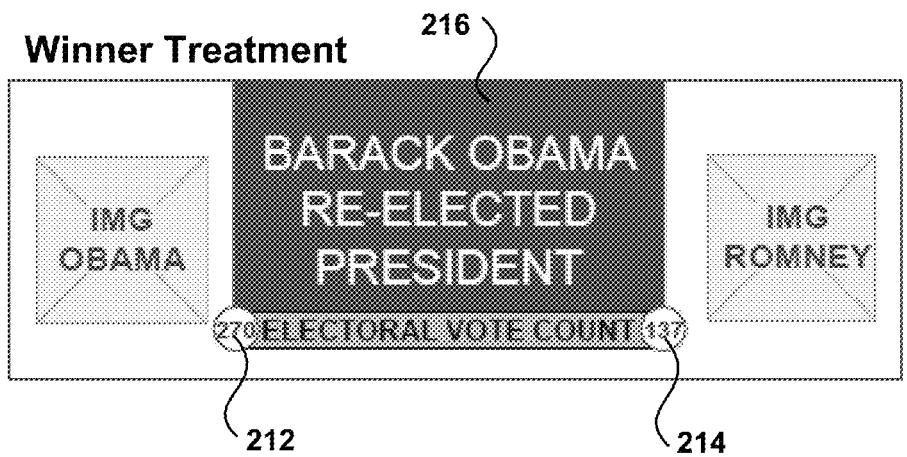

Continuing with the election event example, as the evening progresses and more results are called in from different states, the countdown module tracks each candidate's progress and when a candidate reaches the required number of votes, the reconfiguration logic identifies the winning status of the candidate and selects the content format for presenting the required graphics identifying the winner, as illustrated in box 216 in FIG. 3D. The vote circles 212 and 214 continue to render the electoral vote status of each candidate.

Figure 3E:
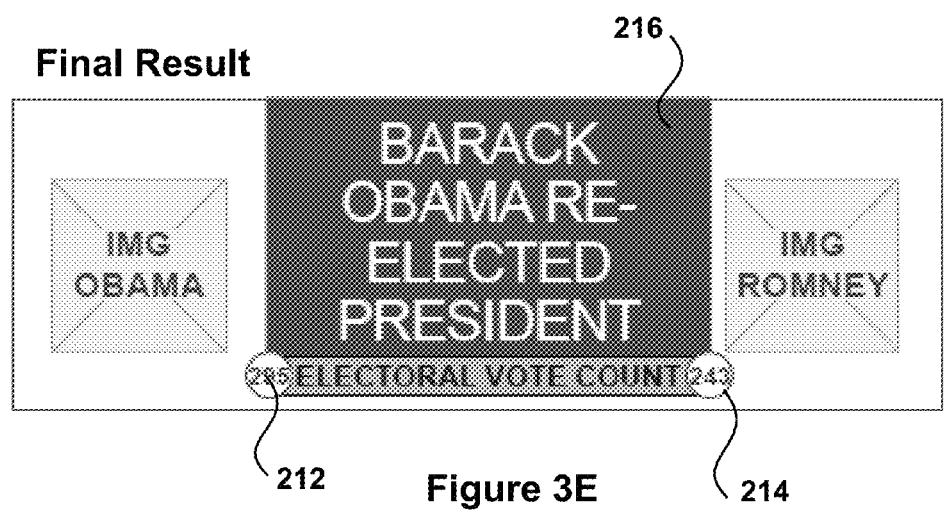

At the end of the evening or when the final result is announced, the countdown module will illustrate the graphics, in box 216, for the winning candidate and the vote circles 212 and 214 will provide the final vote tally of each candidate, as illustrated in FIG. 3E. The above example of countdown module is just one example of how the content modules are used to provide the latest information related to the event in each content module so as to provide the user with up-to-date information for the event.

FIGS. 4A and 4B illustrate social media options for sharing content modules or the dashboard format of the webpage with other users. FIGS. 4A and 4B illustrate exemplary social media accounts of the user from which links may be provided to access the dashboard format of the website to enable the users to have a "Control Room" experience of the event. The user may access the one or more social media accounts through user authentication and post the link to the website within a content stream or in a post, inviting other users to share their experience. The social media options illustrated in FIGS. 4A and 4B are exemplary and should not be considered limiting. Other forms of sharing the links may be employed including sharing the link through electronic mail, presented as a scannable code within a social stream or shared through electronic mail, etc.

The various embodiments describe a processing module that processes content from a plurality of sources and presents the content to users in a dashboard format on a webpage of a website. The dashboard format allows users to expand on certain ones of the modules to obtain additional content. When certain ones of the modules expand, the processing module automatically resizes one or more of the remaining modules and moves them out of the rendering area of the selected content module so as to provide access to all the content modules. While the user is absorbing the content from the selected content module, the remaining content modules continue to receive and dynamically update the content that is being rendered therein so that the user can continue to get latest updates of the event at each of the plurality of modules. In some embodiments, the user may be provided with a default set of content modules but may be able to customize the content modules to include content from content sources of user's choice.

Figure 5:
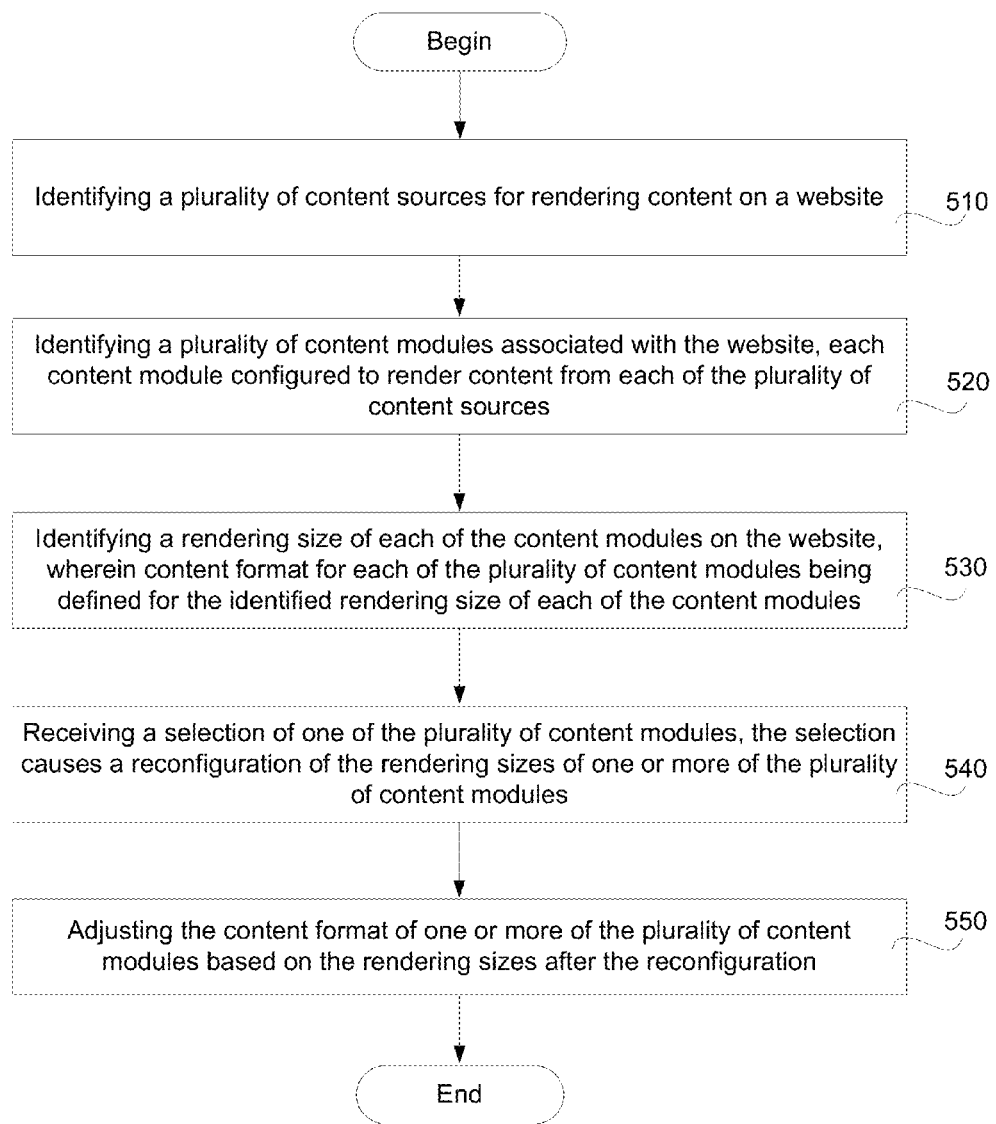
FIG. 5 illustrates exemplary method operations followed for recommending a media content, in accordance with an embodiment of the invention.

FIG. 5 illustrates method operations used for processing content from various content sources, in one embodiment of the invention. The method begins with the identification of a plurality of content sources for providing content on a website, as illustrated in operation 510. The content sources may be selected based on type of content to be included for the website and the selected content sources may be replaced with other content sources by users.

A plurality of content modules associated with the website, are identified, as illustrated in operation 520. The content modules may be defined by a webpage designer or may be identified based on type of content selected for rendering. Each content module is configured to render content from each of the plurality of content sources. The content module identifies a display area on the webpage of the website. A rendering size of each of the content module that are to be rendered on the website, is identified, as illustrated in operation 530. The rendering size of the content modules may be defined by a designer or defined based on the type of content that is to be presented. The rendering size of each content module drives the content format used in rendering the content.

A selection of one of the plurality of content modules rendered on the website's webpage, is received, as illustrated in operation 540. In one embodiment, the selection may be in the form of a click selection, touch selection, gesture selection, voice selection, or any combinations thereof. The aforementioned selection methods are exemplary and should not be considered limiting. As a result, other forms of selection may be provided. The selection causes reconfiguration of the rendering sizes one or more of the plurality of content modules rendered on the website. The selection may cause rendering of an expanded format of the selected content module and reduced format of one or more of the non-selected content modules. The reconfiguration of the content modules may include moving the content modules from one location to another to make room for rendering the expanded version of the selected content module while providing access to the remaining non-selected content modules. The reconfiguration may also allow addition of one or more content modules, deletion of one or more content modules, rearranging the location of one or more content modules by moving the selected content module to a prominent position, moving one or more of the content modules to a side, etc.

Based on the rendering sizes of the content modules after the reconfiguration, the content format of the one or more of the plurality of content modules are adjusted, as illustrated in operation 550. The adjustment of the content format based on the rendering size will result in the selection of appropriate content for each of the content modules. For content modules whose rendering size were adjusted, relevant content that is suited for the rendering size are selected from the same source so as to give complete perspective of the selected event for the user.

The various embodiments describe ways to process content from different content sources for a multi-faceted event to enable users to access multiple channels of information from within the confines of a single page. The users can focus on one channel or may provide equal weight to all the channels presented. The content modules in expanded, minimized or medium presentation state continue to update content dynamically from the respective content sources. For example, a live video would continue playing in each rendering size, a content stream will continue to update in substantial real-time. As a result, the user gets the entire story from multiple channels in a single window and the modular design gives constant access to multiple streams and content related to the event, while the user remains in a single space (i.e., webpage). It should be noted that even though the various embodiments were described with reference to an event related to presidential election, the teachings of the various embodiments may be extended to other multi-faceted events.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system is depicted in FIGS. 6A-6C.

Figure 6A:
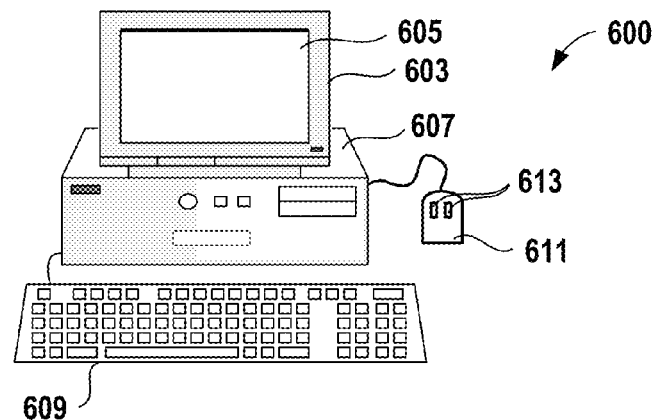
FIG. 6A is a generalized diagram of a typical computer system suitable for use with the present invention.

In FIG. 6A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 6B:
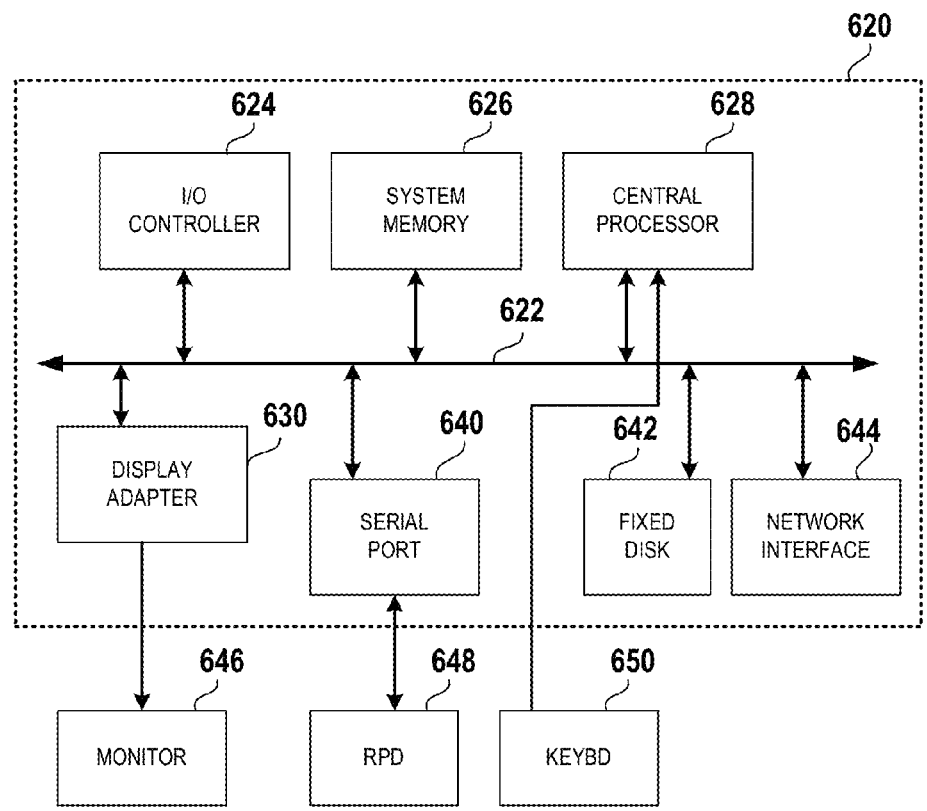
FIG. 6B shows subsystems in the typical computer system of FIG. 6A.
Figure 6C:
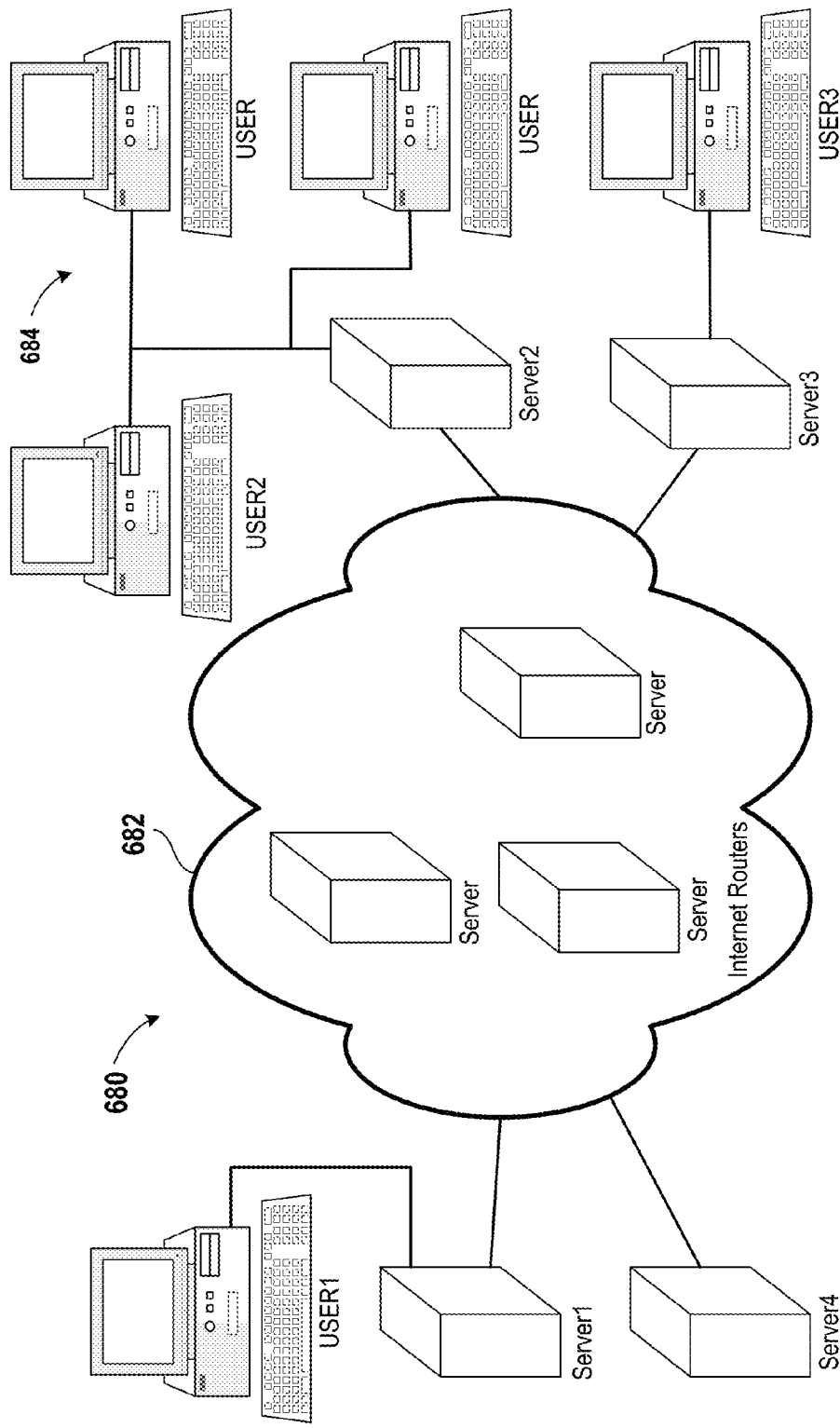
FIG. 6C is a generalized diagram of a typical network suitable for use with the present invention.

FIG. 6B illustrates an exemplary subsystems that might typically be found in a computer such as computer 600. In FIG. 6B, subsystems within box 620 are directly interfaced to internal bus 622. Such subsystems typically are contained within the computer system such as within cabinet 607 of FIG. 6A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 6A, many subsystem configurations are possible. FIG. 6B is illustrative of but one suitable configuration. Subsystems, components or devices other than those shown in FIG. 6B can be added. A suitable computer system can be achieved without using all of the subsystems shown in FIG. 6B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 6C is a generalized diagram of a typical network. In FIG. 6C, the network system 680 includes several local networks coupled to the Internet. Although specific network protocols, physical layers, topologies, and other network properties are presented herein, embodiments of the present invention are suitable for use with any network.

In FIG. 6C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing content from multiple content sources, comprising:
   identifying a plurality of content sources for rendering content on a website;
   identifying a plurality content modules associated with the website, each content module configured to render content from a specific one of the plurality of content sources;
   identifying a rendering size of each of the plurality of content modules on the website, wherein a content format for content included in each of the plurality of content modules being defined based on the identified rendering size of the respective content modules;
   providing data to create a webpage by including information related to the plurality of content modules identified for the website, wherein content for each content module is identified in accordance to the content format defined by the rendering size, the data for creating the webpage forwarded to a client device to enable the client device to generate the webpage and render the webpage on a display screen associated with the client device, in response to a user's selection of the website;
   receiving data indicative of a selection of one of the plurality of content modules rendered on the webpage at the client device, the selection causes generation of data for a dynamic reconfiguration of the rendering sizes of the selected content module and certain ones of the plurality of content modules of the webpage and forwarding the data to the client device to enable reconfiguration of the selected content module and certain ones of the content modules included in the webpage rendered on the display screen, wherein the reconfiguration of the selected content module and the certain ones of the plurality of content modules within the webpage allows a user to access and view the plurality of content modules rendered on the webpage, and wherein data provided for the reconfiguration includes data for adjusting the content in accordance to the content format defined for the selected content module and certain ones of the plurality of content modules based on the rendering sizes after the reconfiguration.

2. The method of claim 1, wherein the content sources include one or more content providers, wherein when the content provider for two or more content modules is same, content from the same content provider is in different format or are of different content type.

3. The method of claim 1, wherein data related to the plurality of content modules include data to identify display areas on the webpage for rendering each one of the plurality of content modules, selects ones of the plurality of content modules configured to move to one or more locations on the website based on the selection.

4. The method of claim 1, wherein the rendering size defines one or more of a shape, a rendering area, or a placement location on the website.

5. The method of claim 1, wherein the content format is defined based on content type, the content type includes one or more of streaming content, image content, drawing content, static content, dynamically changing content, feed content, social content, news outlet content, video content, ad content, interactive content, chat content, or combinations thereof.

6. The method of claim 1, wherein the data indicative of the selection includes data identifying one or more of click selection, touch selection, gesture selection, voice selection, or combinations thereof.

7. The method of claim 1, wherein the selection at the client device triggers a signal from the client device rendering the webpage, to a server to use reconfiguration logic to provide data to enable placement of the selected content module in a prominent location on the webpage.

8. The method of claim 7, wherein data for placing further includes data for adjusting the rendering size of the selected content module to be larger than the non-selected content modules and data to enhance the content format for the selected content module relative to the non-selected content modules.

9. The method of claim 1, wherein data for reconfiguration further includes one or more of data for rearranging one or more of the plurality of content modules to one or more locations on the website, data for removing one or more of the plurality of content modules, data for adding one or more of the content modules, data for adjusting the rendering size of the selected and non-selected content modules, or combinations thereof.

10. The method of claim 1, wherein the data for reconfiguration includes data to expand a size of the selected content module to cover a substantial portion of the display screen of the client device.

11. The method of claim 1, wherein data for adjusting the content format includes data for increasing content quality of the selected content module relative to the non-selected content modules, data for reducing content quality of the non-selected content modules relative to the selected content module, data for increasing bandwidth for receiving content for the selected content module, data for reducing bandwidth for receiving content for the non-selected content modules, data for retrieving additional amount of multimedia content for a topic defined in the selected content module relative to the non-selected content modules, data for retrieving minimal amount of multimedia content for topics defined in the non-selected content modules relative to the selected content module, data for directing audio output to the selected content module, data for converting a still content to video content, data for converting an image content to video content, or any two or more combinations thereof, wherein the video is interactive.

12. The method of claim 1, wherein the content rendered in each of the content modules is streaming content that is dynamically updated at the respective ones of the content modules in parallel from the plurality of content sources.

13. A method for processing content from multiple content sources, comprising:

providing data to create a webpage by including information related to a plurality of modules identified for a website, each of the plurality of modules configured to render content obtained from a content source, wherein data for each of the plurality of modules presented on the webpage includes data associated with a rendition state, wherein content format for the content included in each of the plurality of modules being defined in accordance to the rendition state of the respective plurality of modules, the data for creating the webpage forwarded to a client device to enable the client device to generate the webpage and render the webpage on a display screen associated with the client device, in response to a user's selection of the website;

receiving data indicative of a selection of one of the plurality of modules rendering on the webpage, the selection causing generation of data for a dynamic reconfiguration of the selected module and certain ones of the plurality of modules of the webpage; and forwarding the data to the client device to enable reconfiguration of the selected module and the certain ones of the modules included in the webpage rendered on the display screen, wherein the reconfiguration of the selected module and the certain ones of the plurality of modules within the webpage allows a user to access and view the plurality of modules rendered on the webpage after reconfiguration, and wherein data provided for reconfiguration includes data for adjusting the content in the selected module and the certain ones of the plurality of modules in accordance to the content format defined for respective ones of the plurality of modules based on rendition state.

14. The method of claim 13, wherein data for reconfiguration further includes data for rearranging one or more of the plurality of modules to one or more locations on the webpage, data for removing one or more of the plurality of modules, data for adding one or more of the modules, data for adjusting the rendering size of the selected and non-selected modules, or two or more combinations thereof.

15. The method of claim 13, wherein data for adjusting the content format includes data for increasing content quality of the selected module relative to the non-selected modules, data for reducing content quality of the non-selected modules relative to the selected module, data for increasing bandwidth for receiving content for the selected module, data for reducing bandwidth for receiving content for the non-selected modules, data for retrieving additional amount of multimedia content relative to the selected module, data for retrieving minimal amount of multimedia content relative to the selected module, data for directing audio output to the selected module, data for converting a still content to video content, data for converting an image content to video content, or any combinations thereof, wherein the video is interactive.

16. The method of claim 13, wherein one or more of the plurality of modules is configured to allow user interaction.

17. The method of claim 13, wherein data for reconfiguration further includes, data for presenting alternate content for a specific module that is reconfigured to a different rendition state, wherein the alternate content is related to a topic of the specific module.

18. A non-transitory computer-readable medium having program instructions, which when executed by a processor processes content from multiple content sources, the computer-readable medium comprising:

program instructions for identifying a plurality of content sources for rendering content on a website;

program instructions for identifying a plurality of content modules associated with the website, each content module configured to render content from a specific one of the plurality of content sources;

program instructions for identifying a rendering size of each of the plurality of content modules on the website, wherein a content format for content included in each of the plurality of content modules being defined based on the identified rendering size of the respective content modules;

program instructions for providing data to create a webpage by including information related to the plurality of content modules identified for the website, wherein content for each content module is identified in accordance to the content format defined by the rendering size, wherein the program instructions for providing the data includes program instructions for forwarding the data for creating the webpage to a client device to enable the client device to generate the webpage and render the webpage on a display screen associated with the client device, in response to a user's selection of the website;

program instructions for receiving data indicative of a selection of one of the plurality of content modules rendered on the webpage at the client device, the selection causes generation of data for a dynamic reconfiguration of the rendering sizes of the selected content module and certain ones of the plurality of content modules of the webpage and forwarding of the data to the client device to enable reconfiguration of the selected content module and certain ones of the content modules included in the webpage rendered on the display screen, wherein the reconfiguration of the selected content module and the certain ones of the plurality of content modules within the webpage allowing a user to access and view the plurality of content modules rendered on the webpage, and wherein program instructions for providing data for the reconfiguration includes program instructions for adjusting the content in accordance to the content format defined for the selected content module and certain ones of the plurality of content modules based on the rendering sizes after the reconfiguration.

19. The computer-readable medium of claim 18, wherein the program instruction for receiving data indicative of a selection further includes program instruction for triggering a signal the client device to a server to use reconfiguration logic to provide data to enable placement of the selected content module in a prominent location on the webpage.

20. The computer-readable medium of claim 19, wherein program instruction for triggering a signal further includes program instruction for adjusting the rendering size of the selected content module to be larger than the non-selected content modules and provide data to enhance the content format for the selected content module relative to the non-selected content modules.

* * * * *